United States Patent [19]

Utsumi et al.

[11] Patent Number: 4,733,939
[45] Date of Patent: Mar. 29, 1988

[54] RADIATION-RESISTANT OPTICAL CONDUCTOR

[75] Inventors: Atsushi Utsumi; Hiroyuki Hayami, both of Itami, Japan

[73] Assignees: Mitsubishi Metal Co.,, Tokyo; Dainichi-Nippon Cables, Ltd., Amagasaki, both of Japan

[21] Appl. No.: 763,734

[22] Filed: Aug. 8, 1985

[30] Foreign Application Priority Data

Aug. 18, 1984 [JP] Japan .................. 59-171714
Aug. 18, 1984 [JP] Japan .................. 59-171715
Aug. 18, 1984 [JP] Japan .................. 59-171716

[51] Int. Cl.$^4$ ............................. G02B 6/10
[52] U.S. Cl. ................. 350/96.30; 350/96.34; 65/3.11
[58] Field of Search ........... 350/96.29, 96.30, 96.33, 350/96.34

[56] References Cited

U.S. PATENT DOCUMENTS 4,566,754 1/1986 Beales et al. ................. 350/96.30

FOREIGN PATENT DOCUMENTS 0072107 4/1983 Japan .................. 350/96.29

Primary Examiner—Eugene R. LaRoche
Assistant Examiner—James C. Lee
Attorney, Agent, or Firm—Armstrong, Nikaido, Marmelstein & Kubovcik

[57] ABSTRACT

It is disclosed that a radiation-resistant optical conductor, such as an optical fiber for telecommunication, a multiple fiber for an image scope, and a light guide for illumination, which comprises a core composed of a pure silica glass which is prepared via an ultrahigh temperature of at least 3,000° C. and has an OH group content of from 0.1 to 300 ppm, and a cladding layer formed on the core, and the cladding layer being composed of a silica glass which contains boron element and fluorine element as a dopant.

8 Claims, 5 Drawing Figures

RADIATION-RESISTANT OPTICAL CONDUCTOR

BACKGROUND OF THE INVENTION

The present invention relates to a radiation-resistant silica glass optical conductor, such as an optical fiber for telecommunication, a multiple fiber for an image scope, and a light guide for illumination.

It has been proposed or tried to use an optical conductor as a means for telecommunication, measurement, and control in the sites where it is possible to receive harmful irradiation, such as an atomic pile, an atomic ship, an artificial satellite and the like.

In general, optical conductors consist of a core through which optical energy or signals pass, and a cladding layer formed on the core. Multi-mode optical conductors have a very thin cladding layer of several micron meter order, because the optical energy escapes hardly from the core into the cladding layer as compared with the case of single-mode optical conductors. Multi-mode optical conductors, however, will increase markedly their optical transmission loss when received irradiation, such as gamma rays, X-rays etc.

It is well-known that silica glass optical conductors have excellent radiation resistance as compared with multi-component glass optical conductors. According to the studies of the present inventors, however, the radiation resistance of the silica glass optical conductors are various, and are varied by the material which composes of the core or the cladding layer.

SUMMARY OF THE INVENTION

An object of the present invention is to provide a radiation-resistant silica glass optical conductor.

Another object of the present invention is to provide a radiation-resistant optical fiber used for telecommunication.

Still another object of the present invention is to provide a radiation-resistant multiple fiber used for industrial and medical image scopes.

Still another object of the present invention is to provide a radiation-resistant light guide used for illumination.

More specifically, the present invention provides a radiation-resistant optical conductor which comprises a core composed of a pure silica which is prepared via an ultrahigh temperature of at least 3,000° C. and has an OH group content of from 0.1 to 300 ppm, and a cladding layer formed on the core, the cladding layer being composed of a silica glass which contains boron element and fluorine element as a dopant.

BRIEF DESCRIPTION OF THE DRAWINGS

Each of FIGS. 1 and 2 is a cross-sectional view of an optical fiber for telecommunication or a light guide for illumination in accordance with the present invention.

DETAILED DESCRIPTION OF THE INVENTION

Figure 1:
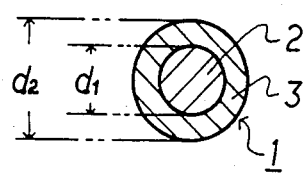

Refering now to FIGS. 1 to 5, each optical conductor 1 comprises a core 2 composed of a pure silica glass and a cladding layer 3 composed of a doped silica glass. The optical conductor 1 shown in FIG. 2 has furthermore a support layer 4 formed on the cladding layer 3 and composed of a silica glass. The optical conductor 1 (multiple optical fiber) shown in FIG. 3 has such a structure that a plurality of unit optical conductors 5 each of which consists of the core 2, the cladding layer 3, and the support layer 4 are fused together.

The optical conductor 1 of FIG. 1 can be prepared, for example, by such a method that a doped silica glass which becomes the cladding layer 3 is applied on a pure silica glass rod which becomes the core 2, and then the resultant rod is heated to a high temperature above the drawing temperature of pure silica glass and is drawn. In another method a preform having three layers structure, that is, a core, a cladding layer, and a support layer, is prepared by the rod-in-tube method described later, thenafter the support layer is removed by fire polishing, and the resultant rod is drawn.

Figure 2:
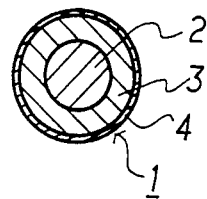

The optical conductor of FIG. 2 can be prepared, for example, by applying in turn a doped silica glass (the cladding layer) and a silica glass (the support layer) on a pure silica glass rod (the core), and by drawing. The conductor of FIG. 2 can also be prepared by applying a cladding layer on the inner surface of a silica glass tube, inserting a pure silica glass rod, collapsing the assembly thus obtained to make a preform, and drawing the preform.

Figure 3:
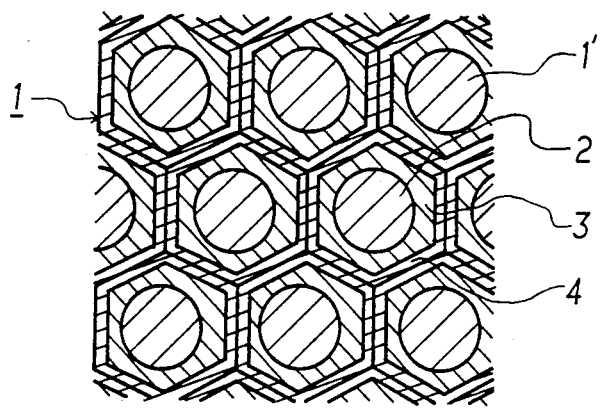
FIG. 3 is a cross-sectional view of a multiple fiber in accordance with the present invention.

The optical conductor 1 of FIG. 3 can be prepared by bundling a multiplicity, for example from $10^2$ to $10^6$, of optical conductors shown in FIG. 2 per se or preforms thereof, and by drawing the bundle. A multiple optical fiber which is prepared by drawing a bundle of the optical conductors of FIG. 1 or preforms thereof is also an important embodiment of the present invention.

The core 2 to be used in the present invention should be composed of a pure silica glass satisfying the following requirements:

(1) being prepared via an ultrahigh temperature of at least 3,000° C., and (2) having an OH group content of from 0.1 to 300 ppm. With a core material which does not satisfy one or both of the above requirements it fails to obtain an optical conductor excellent in radiation resistance. Preferable core materials have an OH group content of from 0.5 to 300 ppm, especially from 1 to 100 ppm, and/or prepared via an ultrahigh temperature of at least 4,000° C., especially at least 5,000° C.

Silica glass which satisfies the above requirements can be obtained, for example, by the following way: a gas mixture consisting of silicon tetrachloride, oxygen and a small amount of water vapor is furnished into a portion, held at a temperature of at least 3,000° C., of a high temperature plasma, such as argon plasma, oxygen plasma, neon plasma, nitrogen plasma and the like. The silicon tetrachloride is oxidized by the oxygen in the mixed gas to yield silicon oxide which is heated simultaneously with the yield thereof at a temperature of the plasma. Silica glass satisfying the above requirements may also be obtained by heating silica powder, which is produced in a certain process, at above 3,000° C., for example in argon plasma or other high temperature plasma afore-mentioned.

In the present invention silica glass which is prepared using argon plasma or oxygen plasma, especially argon plasma is more preferable, because the silica glass provides an optical conductor having more excellent radiation resistance.

Besides the above requirements, it is also necessary in the present invention that the cladding layer 3 is made of a silica glass doped with boron element and fluorine element. Those dopants may exist in any state in the silica glass. For example, boron or its chemical compound with other elements such as oxygen, and fluorine or its chemical compound with other elements such as oxygen, boron etc. are dispersed physically in the silica glass, or those dopants are bonded chemically to the molecules of silica glass.

The doped silica glass can be formed on the surface of a pure silica glass rod or on the inner surface of a silica glass tube by well-known chemical vapor deposition with using, for example, a gas mixture of $BCl_3$, $FCl_3$, $SiCl_4$, and $O_2$, a gas mixture of $BCl_3$, $SiF_4$, and $O_2$, a gas mixture of $BF_3$, $SiCl_4$, and $O_2$, and the like. The amounts of boron element and fluorine element in the above gas mixtures are from 5 to 200 parts by weight, preferably from 10 to 100 parts by weight of boron, from 10 to 500 parts by weight, preferably from 50 to 400 parts by weight of fluorine per 100 parts by weight of silicon element.

Among gas mixtures above mentioned, most preferable is a mixture of $BCl_3$, $SiF_4$, and $O_2$, and a mixture of $BF_3$, $SiF_4$, and $O_2$ from the standpoint of manufacturing optical conductors having more excellent radiation resistance.

Difference of refractive index between the core 2 and the cladding layer 3 is at least 0.008, preferably from 0.01 to 0.015. In general, the greater the ratio of $d_1/d_2$ is, wherein $d_1$ is the outer diameter of the core 2 and $d_2$ is the outer diameter of the cladding layer 3, and the more preferable for radiation resistance of the optical conductors. The value $d_1/d_2$ is more preferably from 0.45 to 0.9, most preferably from 0.55 to 0.8.

A multiple optical fiber, as an embodiment of the present invention, may be produced by the following manner as mentioned above that a bundle of optical fibers or preforms thereof is drawn at a temperature of from 1,800° to 2,200° C. to a fiber having a desired outer diameter, for example 0.4 to 3 mm, freferably 0.7 to 2 mm. Each unit optical conductor 5 in the conductor of FIG. 3 is preferably from 5 to 30 μm in the outer diameter of the core 2, and from 1.5 to 10 μm in the thickness of the cladding layer 3 for radiation resistance.

The embodiments of FIGS. 2 and 3 have the support layer 4, and impurities in the support layer lower frequently the radiation resistance of the optical conductor. Therefore, as a silica glass of the support layer 4, a pure silica glass is preferable, such as natural or synthetic silica glass having a drawing temperature of at least 1,800° C., especially synthetic silica glass more than 99.99%, most preferably more than 99.9999% by weight in purity.

The following examples illustrates in greater detail the optical conductor of the present invention, but they are not to be construed as limiting the scope of the present invention. In the following examples part and % all means as part by weight and % by weight, respectively, unless otherwise explained.

EXAMPLE 1

A gas mixture consisting of $SiCl_4$, argon, and a moist oxygen which is prepared by bubbling distilled water with a pure oxygen was ejected to the top of an argon plasma in a high frequency wave plasma furnace. The argon plasma is maintained by applying a high frequency current of 4 MHz and has a temperature of approximately 5,500° C. in the mid portion thereof. The value of the temperature was evaluated relative intensity of two spectral lines (5153A and 5700A) of copper doped intentionally into plasma flame only for the temperature evaluation. The $SiCl_4$ was oxidized at such high temperature to produce an accumulation of pure silica glass on the bottom of the furnace, which is 50 ppm in OH group content, and 1.4585 in refractive index at 20° C. The content of OH group in the silica glass was measured by the following method.

Measurment of OH group content : the OH group content (OH, ppm) is obtained from the equation (1) when OH is 1 ppm or more, or the equation (11) when OH is lower than 1 ppm, $$OH = 1.2 \times (L1 - L0) \quad (1)$$

$$OH = 1.85 \times (L3 - L2) \times 10^{-2} \quad (11)$$

wherein L1 is the loss value (dB/km) of an optical conductor tested at a wave length of 0.94 μm, L0 the assumed loss value at the same wave length of the optical conductor when OH group content thereof is zero, L3 the loss value (dB/km) of an optical conductor tested at a wave length of 1.38 μm, and L2 the assumed loss value at the same wave length of the optical conductor when OH group content thereof is zero.

A core rod having an outer diameter of 11 mm made of the above pure silica glass was inserted into a natural silica glass tube (outer diameter: 26 mm, thickness: 1.5 mm, refractive index at 20° C.: 1.4459) having on its inner surface a doped silica glass layer (refractive index at 20° C.: 1,4465) which is formed by chemical vapor deposition method with using $SiCl_4$, $BF_3$, and $O_2$, and collapsed by rod-in-tube method to obtain a preform having an outer diameter of 18.9 mm. The preform was drawn at 2,100° C., and thus an optical fiber 300 μm in outer diameter was prepared.

Six thousands of the optical fibers each of which is 20 cm in length were filled compactly in a silica glass tube, washed with an aqueous solution of fluoric acid (20% by volume), further washed with distilled water with an action of ultrasonic wave, dried, and drawn together with the silica glass tube at 2,000° C. to form a multiple fiber having an outer diameter of 1.0 mm, 12 μm in the outer diameter of each optical fiber unit in the multiple fiber, 7.5 μm in the outer diameter of the core in the optical fiber unit, 2.0 μm in the thickness of the cladding layer of the optical fiber unit, and 0.012 in difference of refractive index between those of the core and the cladding layer.

The radiation resistance of the miltiple fiber was evaluated by the following irradiation test.

Figure 4:
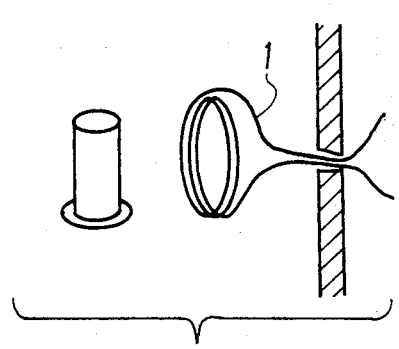
FIG. 4 is an explanatory figure for explaining a method of testing the radiation resistance of an optical conductor in the atmosphere.
Figure 5:
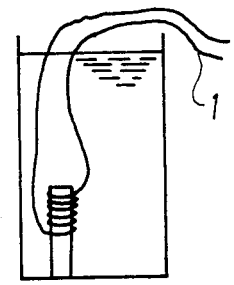
FIG. 5 is an explanatory figure for explaining a method of testing the radiation resistance of an optical conductor in the water.

IRRADIATION TEST $Co^{60}$ irradiation tests with dose rate of from $2 \times 10^2$ to $3 \times 10^5$ R/H (total dose: from $3 \times 10^4$ to $6 \times 10^5$ R) were carried out in the air, as shown in the test diagram of FIG. 4, and tests with dose rate of $7 \times 10^5$ (total dose: $5 \times 10^7$) were carried out in the water, as shown in FIG.

5. Test specimens in predetermined length (10 m for irradiation in the air, 5 m for irradiation in the water) were coiled and allowed to stand at a predetermined distance from the radiation source. Both ends of the specimen were taken out of the wall penetration or water. One end was connected to a 300 W multi halogen-mercury lamp used as a light source and output power from the another end was measured by means of a monochrometer-photometer. The test specimens were disconnected from the light source for the interval where the measurement was not conducted in order to minimize light bleating effect. The results were shown in Table 1.

EXAMPLE 2

A multiple optical fiber was produced in the same manner as in Example 1 except that the optical fiber having a diameter of 300 μm was fire-polished in advance of filling in the tube to form a two layer fiber 11.5 μm in outer diameter.

EXAMPLES 3 AND 4

Multiple optical fibers were produced in the same manner as in Example 1 except that in Example 3, 4,000 of the optical fibers were employed to form a multiple optical fiber, each optical fiber unit of which is 10 μm in the outer diameter of the core, 2.0 μm in the thickness of the cladding layer, and 15 μm in the outer diameter of the unit, and in Example 4, 2,000 of the optical fibers were employed to form a multiple optical fiber, each optical fiber unit of which is 16 μm in the outer diameter of the core, 2.0 μm in the thickness of the cladding layer, and 22 μm in the outer diameter of the unit.

EXAMPLES 5 TO 7

Productions of multiple fibers were duplicated in the same manner as in Example 1 except that the number of the optical fibers, the outer diameter of the core, the thickness of the cladding layer, and the outer diameter of the unit were 4,000, 10 μm, 2.9 μm, and 17 μm in Example 5, 2,000, 15 μm, 3.9 μm, and 25 μm in Example 6, 1,000, 25 μm, 7.3 μm, and 42 μm in Example 7, respectively.

COMPARATIVE EXAMPLE 1

A multiple optical fiber is produced in the same as in Example 1 except that a core rod having an OH content of 600 ppm is used.

COMPARATIVE EXAMPLE 2

A multiple optical fiber is produced in the same manner as in Example 1 except that a core rod is used, which is prepared by using oxyhydrogen flame wherein $SiO_2$ yielded is heated at a temperature of lower than 2,300° C., and has an OH content of 800 ppm.

COMPARATIVE EXAMPLE 3

A multiple optical fiber is produced in the same manner as in Example 1 except that instead of using a gas mixture of $SiCl_4$, $BF_3$, and $O_2$, a gas mixture of $SiF_4$ and $O_2$ was used to form a doped silica glass layer on the inner surface of the natural silica glass tube.

Radiation resistances of Examples 2 to 7, and Comparative Examples 1 to 3 were measured by the same test described above, and the results were shown in Table 1.

TABLE 1

| Example & Comparative Example | Wave Length (μm) | Loss Increase (dB/10 m) | | | |
|---|---|---|---|---|---|
| | | Dose Rate: $2 \times 10^2$ R/H Total Dose: $3 \times 10^4$ R | Dose Rate: $1 \times 10^4$ R/H Total Dose: $3 \times 10^4$ R | Dose Rate: $3 \times 10^5$ R/H Total Dose: $6 \times 10^5$ R | Dose Rate: $7 \times 10^5$ R/H Total Dose: $5 \times 10^7$ R |
| Example 1 | 0.5 | 0.68 | 1.7 | 10 | 19 |
| | 0.6 | 0.29 | 1.0 | 7 | 12 |
| Example 2 | 0.5 | 0.40 | 1.2 | 6 | 12 |
| | 0.6 | 0.21 | 0.8 | 4 | 7 |
| Example 3 | 0.5 | 0.3 | 1.0 | 3.2 | 9 |
| | 0.6 | 0.16 | 0.6 | 1.8 | 6.5 |
| Example 4 | 0.5 | 0.25 | 0.8 | 2.8 | 7 |
| | 0.6 | 0.14 | 0.5 | 1.8 | 4 |
| Example 5 | 0.5 | 0.28 | 0.9 | 3.2 | 8 |
| | 0.6 | 0.15 | 0.6 | 2.0 | 5.5 |
| Example 6 | 0.5 | 0.20 | 0.65 | 2.2 | 5 |
| | 0.6 | 0.12 | 0.40 | 1.5 | 3.5 |
| Example 7 | 0.5 | 0.14 | 0.40 | 1.5 | 3.6 |
| | 0.6 | 0.09 | 0.25 | 1.0 | 2.0 |
| Co. Example 1 | 0.5 | 7.1 | 7.0 | 23 | 64 |
| | 0.6 | 5.2 | 5.0 | 20 | 58 |
| Co. Example 2 | 0.5 | 14.0 | 14.5 | 30 | 76 |
| | 0.6 | 10.8 | 11.5 | 26 | 59 |
| Co. Example 3 | 0.5 | 3.0 | 5.8 | 25 | 45 |
| | 0.6 | 1.8 | 3.9 | 16 | 29 |

EXAMPLE 8

The same production of a multiple optical fiber as in Example 1 was duplicated with the exception that an oxygen plasma having a temperature of about 6,500° C. is employed to obtain a core rod composed of silica glass heated at the above high temperature. The multiple optical fiber consists of 6,000 optical fiber units each of which is 7.5 μm in the outer diameter of the core, 2.0 μm in the thickness of the cladding layer, 12 μm in the outer diameter thereof, and 0.012 in the difference of refractive index between those of the core and the cladding layer.

EXAMPLE 9

A multiple optical fiber was produced in the same manner as in Example 8 except that the optical fiber 300 μm in diameter was fire-polished in advance of filling in the tube to form a two layer fiber 11.5 μm in outer diameter.

EXAMPLES 10 AND 11

Multiple optical fibers were produced in the same manner in Example 8 except that in Example 10, 4,000 of the optical fibers were employed to form a multiple optical fiber, each optical fiber unit of which is 10 μm in the outer diameter of the core, 2.0 μm in the thickness of the cladding layer, and 15 μm in the outer diameter of the unit, and in Example 11, 2,000 of the optical fibers were employed to form a multiple optical fiber, each optical fiber unit of which is 16 μm in the outer diameter of the core, 2.0 μm in the thickness of the cladding layer, and 22 μm in the outer diameter of the unit.

EXAMPLES 12, 13 AND 14

Productions of multiple fibers were duplicated in the same manner as in Example 8 except that the numbers of the optical fibers, the outer diameter of the core, the thickness of the cladding layer, and the outer diameter of the unit were 4,000, 10 μm, 2.9 μm, and 17 μm in in Example 12, 2,000, 15 μm 3.9 μm, and 25 μm in Example 13, 1,000, 25 μm, and 42 μm in Example 14, respectively.

COMPARATIVE EXAMPLE 4

A multiple optical fiber is produced in the same as in Example 8 except that a core rod having an OH content of 600 ppm is used.

COMPARATIVE EXAMPLE 5

A multiple optical fiber is produced in the same manner as in Example 8 except that a core rod is used, which is prepared by using oxyhydrogen flame wherein $SiO_2$ yielded is heated at a temperature of lower than 2,300° C., and has an OH content of 800 ppm.

COMPARATIVE EXAMPLE 6

A multiple optical fiber is produced in the same manner as in Example 8 except that instead of using a gas miture of $SiCl_4$, $BF_3$, and $O_2$, a gas mixture of $SiCl_4$ and $O_2$ was used to form a doped silica glass layer on the inner surface of the natural silica glass tube.

Radiation resistances of Examples 8 to 14, and Comparative Examples 4 to 6 were measured by the same test described above, and the results were shown in Table 2.

TABLE 2

| Example & Comparative Example | Wave Length (μm) | Loss Increase (dB/10 m) | | | |
|---|---|---|---|---|---|
| | | Dose Rate: $2 \times 10^2$ R/H Total Dose: $3 \times 10^4$ R | Dose Rate: $1 \times 10^4$ R/H Total Dose: $3 \times 10^4$ R | Dose Rate: $3 \times 10^5$ R/H Total Dose: $6 \times 10^5$ R | Dose Rate: $7 \times 10^5$ R/H Total Dose: $5 \times 10^7$ R |
| Example 8 | 0.5 | 3.1 | 2.5 | 18 | 28 |
| | 0.6 | 2.3 | 1.4 | 8 | 15 |
| Example 9 | 0.5 | 1.8 | 2.0 | 7 | 16 |
| | 0.6 | 1.2 | 1.5 | 5 | 11 |
| Example 10 | 0.5 | 1.9 | 2.2 | 6 | 13 |
| | 0.6 | 1.1 | 1.5 | 4 | 10 |
| Example 11 | 0.5 | 1.0 | 1.1 | 4 | 8 |
| | 0.6 | 0.7 | 0.7 | 2.5 | 6 |
| Example 12 | 0.5 | 1.6 | 1.7 | 6 | 12 |
| | 0.6 | 1.1 | 1.1 | 4.5 | 8 |
| Example 13 | 0.5 | 1.2 | 1.4 | 4 | 7 |
| | 0.6 | 0.8 | 1.0 | 2.8 | 4.5 |
| Example 14 | 0.5 | 0.8 | 1.1 | 3 | 5 |
| | 0.6 | 0.5 | 0.7 | 1.9 | 3.5 |
| Co. Example 4 | 0.5 | 10 | 11.2 | 22 | 48 |
| | 0.6 | 7.5 | 8.3 | 18 | 35 |
| Co. Example 5 | 0.5 | 14.0 | 14.5 | 80 | 76 |
| | 0.6 | 10.8 | 11.5 | 26 | 59 |
| Co. Example 6 | 0.5 | 5.1 | 6.2 | 18 | 40 |
| | 0.6 | 2.5 | 2.8 | 11 | 22 |

EXAMPLES 15 AND 16

Optical fibers 50 μm in the outer diameter of the core, 15 μm in the thickness of the cladding layer, 22.5 μm in the thickness of the support layer, and 125 μm in the outer diameter thereof were produced in the same manner as the method for producing the optical fiber of 300 μm in outer diameter of Example 1 except that OH content of the core and the temperature at which the gas mixtuer is heated in argon plasma are 0.5 ppm, and about 5,000° C., in Example 15, 3 ppm and about 4,500° C. in Example 16, respectively.

Each optical fiber was coated in turn with a precoating layer on the fiber, with a silicone buffer layer having a thickness of 400 μm on the precoating layer, and a nylon jacket having a thickness of 900 μm, and thus an optical fiber cable to be used for telecommunication was produced.

COMPARATIVE EXAMPLE 7

An optical fiber was produced in the same manner as in Example 15 except that the core rod used is prepared by using oxyhydrogen flame at a temperature of lower than 2,300° C.

Radiation resistances of Examples 15, 16 and Comparative Example 7 were measured by the same test described above except that test specimens 200 m in length were irradiated with a dose rate of $1 \times 10^4$ R/H to a total dose of $1 \times 10^6$ R.

Loss increases (dB/km) at wave lengthes of 0.85 μm and 1.3 μm were 3.5 and 1.8 in Example 15, 5.6 and 3.5 in Example 16 and 26.8 and 35.5 in Comparative Example 7.

What is claimed is:

1. A radiation-resistant optical conductor which comprises a core composed of a pure silica glass which is prepared via an ultrahigh temperature of at least 3,000° C. and has an OH group content of from 0.1 to 300 ppm, and a cladding layer formed on the core, the cladding layer being composed of a silica glass which contains boron element and fluorine element as a dopant.

2. A radiation-resistant optical conductor of claim 1, wherein said pure silica glass is prepared via an ultra-high temperature of at least 4,000° C., and has an OH group content of from 0.5 to 300 ppm.

3. A radiation-resistant optical conductor of claim 1, wherein said pure silica glass is prepared by using an argon plasma or an oxygen plasma.

4. A radiation-resistant optical conductor of claim 1, wherein said cladding layer is provided with a support layer thereon.

5. A radiation-resistant optical conductor of claim 1, wherein the value $d_1/d_2$ is from 0.45 to 0.9, wherein $d_1$ is the outer diameter of the core and $d_2$ is the outer diameter of the cladding layer.

6. A radiation-resistant optical conductor as in anyone of claims 1 to 5, wherein said optical conductor is an optical fiber used for telecommunication.

7. A radiation-resistant optical conductor as in anyone of claims 1 to 5, wherein said optical conductor is a multiple fiber used for an image scope.

8. A radiation-resistant optical conductor as in anyone of claims 1 to 5, wherein said optical conductor is a light guide used for illumination.

* * * * *